Jan. 21, 1930.  W. A. BATES  1,744,153
GRATING
Filed Dec. 2, 1926  2 Sheets-Sheet 1
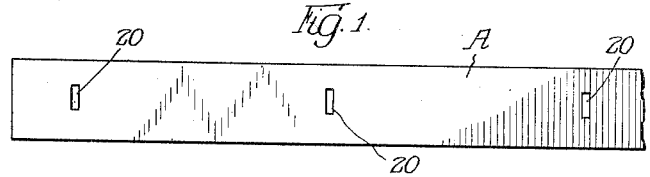
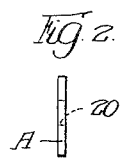
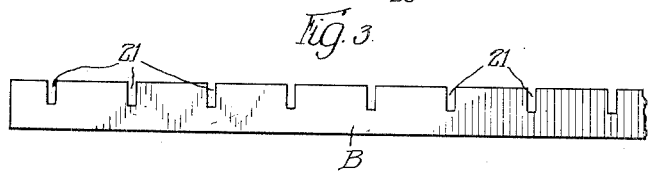
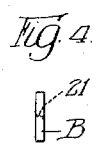
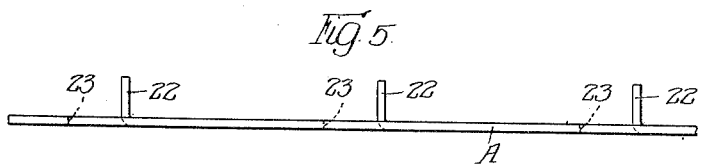
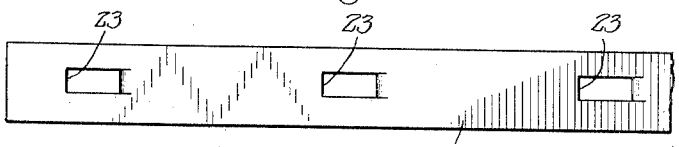
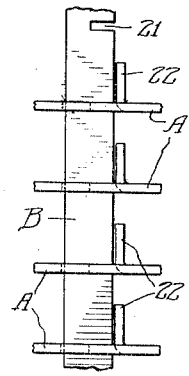
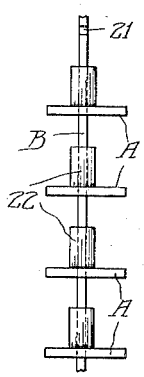
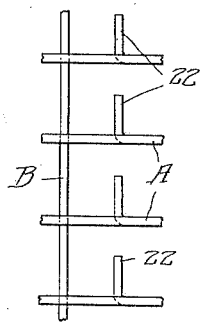
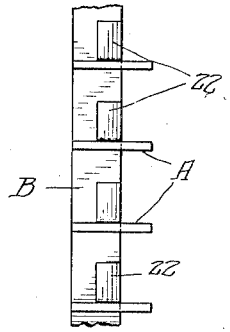
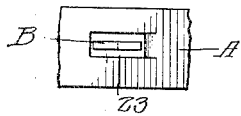
Witness:
P. Burkhardt.
Inventor:
Walter A. Bates.
By Williamson, Huxley, Byrne & Knight
attys.

Jan. 21, 1930.  W. A. BATES  1,744,153
GRATING
Filed Dec. 2, 1926   2 Sheets-Sheet 2
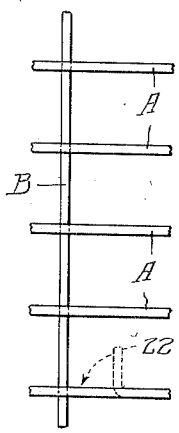
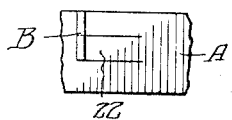
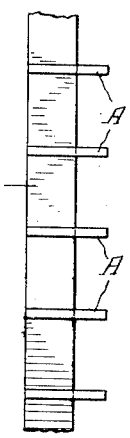
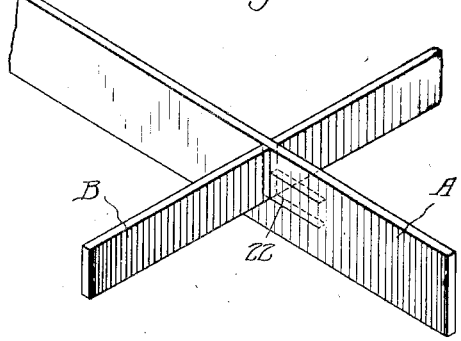
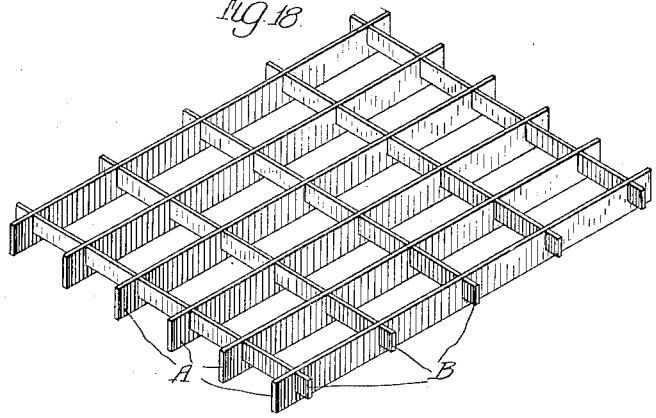

Patented Jan. 21, 1930

1,744,153

UNITED STATES PATENT OFFICE

WALTER A. BATES, OF GARY, INDIANA, ASSIGNOR TO WALTER BATES STEEL CORPORATION, OF GARY, INDIANA, A CORPORATION OF DELAWARE

GRATING

Application filed December 2, 1926. Serial No. 152,078.

The present invention relates to improvements in gratings.

More particularly the present invention relates to metal gratings and will be described in connection with gratings of the type which are used for floors or floor coverings. Gratings for this purpose have been commonly provided by securing parallel flat bars of steel or the like in right angular relationship with other parallel bars of steel or the like, the bars of one or both sets being notched, whereby said bars of the two sets may have a substantially level surface. Gratings as heretofore provided, in so far as applicant has observed, have been open to a number of objections, among which may be mentioned relatively high cost, relatively great weight compared to the strength thereof, and a tendency of the bars to work loose from one another under the loads to which they are subjected.

An object of the present invention is to provide a grating which is relatively simple and cheap to manufacture and in which the bars of steel or the like are so connected together that the effect of wear in loosening the connections between said bars is a minimum.

A further object is to provide a grating involving cross bars in which the weight per unit of strength is a minimum.

A further object is to provided a grating in which the strength per unit of weight is a maximum.

A further object is to provide a method of making gratings from flat strips of steel or the like, which process may be carried out expeditiously and at a minimum of expense.

Further objects will appear as the description proceeds.

Referring to the drawings—

Figures 1 and 2 are side and end elevational views, respectively, of a main bar, as it appears in an intermediate stage in the manufacture of a support bar of a grating, which support bar, for convenience of description, will be termed an A-bar in this specification;

Figures 3 and 4 are side and end elevational views, respectively, of a cross bar used in the practice of the present invention, which cross bar for convenience of description will be termed a B-bar in this specification;

Figures 5, 6 and 7 are views in top plan, side elevation and end elevation, respectively, of an A-bar in process of manufacture, said A-bar having tongues swedged therefrom;

Figure 8 is a view showing a plurality of A-bars arranged in parallel relationship with one another and having a B-bar inserted therethrough;

Figure 9 is a view in side elevation of the structure shown in Figure 8;

Figure 10 is a view in end elevation of the structure shown in Figure 8;

Figures 11, 12 and 13 illustrate the plurality of A-bars and one B-bar at the next stage in the manufacture of the grating, said B-bar having been turned about its longitudinal axis through an angle of 90° from the position of said B-bar in Figures 8, 9 and 10;

Figures 14, 15 and 16 are views in top plan, side elevation and end elevation, respectively, of the structure illustrated in Figures 8 to 13, Figures 14, 15 and 16 illustrating a final step in the manufacture of the grating;

Figure 17 is a perspective view showing the joint between the A-bars and the B-bars; and Figure 18 is a perspective view illustrating a completed grating.

In proceeding with the manufacture of the grating forming the subject matter of the present invention, the A-bars are provided with spaced rectangular apertures 20, which apertures 20 have their longer axes disposed transversely of the A-bar. Said apertures 20 are disposed at approximately the neutral axis of the A-bar and have a width substantially equal to the thickness of the cooperating B-bars.

The B-bars, one of which is shown in Figures 3 and 4, are provided with the spaced notches 21—21, the spacing between the notches 21—21 being the same as the spacing between the parallel A-bars. The B-bars may be of considerably less width and thickness than the A-bars. The width of each of the B-bars will be substantially equal to the spacing from the lowermost edge of the apertures 20 to the upper edge of the corresponding A-bar. The notches 21—21 will be of a depth substantially equal to the thickness of metal between the upper edge of each of the apertures 20 and the upper edge of the A-bar, sufficient clearance being allowed, of course, for manufacture.

Referring to Figures 5, 6 and 7, it will be noted that the A-bars in an intermediate step in manufacture have tongues 22 swedged therefrom providing slots 23, the extremities of said tongues 22—22 being side edges of the notches 20—20, said tongues 22—22 are of sufficient length to provide apertures long enough to receive the B-bars flatwise therein. Figures 8, 9 and 10 show the plurality of A-bars in parallel spaced relationship with one another, one B-bar being inserted flatwise in the apertures 23 of a plurality of A-bars. It will be understood, of course, that a number of B-bars may be inserted into the A-bars simultanenously.

Figures 11, 12 and 13 show one of the B-bars turned about its axis at an angle of 90 degrees and disposed at the left-hand extremities of the apertures 23.

Figures 14, 15 and 16 show a completed grating with the tongues 22 turned back into the planes of the A-bars, thereby locking the B-bars securely in place.

Figures 17 and 18 clearly indicate the manner in which the A-bars and B-bars are locked together to provide a grating.

The A-bars, which are of heavier gauge material than the B-bars, provide the supports for the grating. It will be noted that the construction illustrated has the advantage that the A-bars provide a plurality of channels, the fact that the B-bars are raised above the lower level of the bottoms of the A-bars having the advantage that said channels may be flushed out with a stream of water, whereby cleaning is facilitated.

Many modifications will occur to those skilled in the art. It is intended to cover all such modifications that fall within the scope of the appended claims.

What is claimed is—

1. A grating comprising a plurality of bars arranged in parallel relationship with one another and a plurality of cross bars arranged in parallel relationship with one another, said cross bars being of less width than said first mentioned bars, the upper edges of said cross bars and said first mentioned bars being disposed in a common plane, said first mentioned bars having rectangular apertures therein, said cross bars having their upper edges notched and their lower edges unnotched, said first mentioned bars and said cross bars being fitted together with the top portions of said first mentioned bars above said apertures disposed within the notches of said cross bars, said first mentioned bars having tongues cut therein and disposed longitudinally thereof terminating at said rectangular apertures and abutting against the sides of said cross bars, the bottom edges of said cross bars being disposed at the level of the lower extremities of said apertures.

2. A grating comprising, in combination, a plurality of bars arranged in parallel relationship with one another and a plurality of cross bars arranged in parallel relationship with one another, said first mentioned bars having rectangular apertures therein arranged along the neutral axes thereof, said cross bars having their upper edges notched and their lower edges unnotched, said first mentioned bars and said cross bars being fitted together, said first mentioned bars having tongues arranged longitudinally thereof which tongues abut the side walls of said cross bars to hold said first mentioned bars and said cross bars in rigid relationship with one another, the bottom edges of said cross bars being disposed at the level of the lower extremities of said apertures.

3. A grating comprising, in combination, a plurality of bars arranged in parallel relationship with one another and a plurality of cross bars arranged in parallel relationship with one another, said first mentioned bars having rectangular apertures, said cross bars having their upper edges notched and their lower edges unnotched, said first mentioned bars and said cross bars being fitted together with portions of said first mentioned bars adjacent to said apertures disposed in said notches, said first mentioned bars having tongues therein, said tongues extending longitudinally of said first mentioned bars and abutting against the side walls of said cross bars, said cross bars resting upon said first mentioned bars upon surfaces defined by the lowermost lines of the adjoining tongues.

Signed at Chicago, Illinois, this 26th day of November, 1926.

WALTER A. BATES.